UNITED STATES PATENT OFFICE.

WILLIAM A. KÖNEMAN, OF CHICAGO, ILLINOIS.

PROCESS OF RECOVERING RUBBER FROM RUBBER WASTE.

No. 823,053.

Specification of Letters Patent.

Patented June 12, 1906.

Application filed March 6, 1905. Renewed October 9, 1905. Serial No. 282,019.

*To all whom it may concern:*

Be it known that I, WILLIAM A. KÖNEMAN, a citizen of the United States, residing at Chicago, in the county of Cook and State of Illinois, have invented a new and useful Process of Recovering Rubber from Rubber Waste, of which the following is a specification.

My invention relates to an improvement on the known processes of recovering rubber from cast-off vulcanized rubber articles which involve separation of the fibrous material from the rubber and devulcanization of the latter by boiling the material in the presence of chemicals acting to dissolve the fiber and to remove the sulfur or sulfur compounds and washing the product to cleanse it of the chemicals, particles of fiber, and other impurities. As the art involving the procedure thus generally outlined is now commonly practiced the rubber recovered by practicing it is deficient in strength and elasticity and is rarely entirely devoid of fiber, and goods manufactured from it tend to harden and otherwise deteriorate rapidly. This inherent weakness and inferior degree of elasticity of the reclaimed rubber are caused, as I have discovered, by its prolonged contact with the chemicals and the high temperature to which it is subjected in the treatment referred to, which cause it to lose an undue proportion of the gums and oils forming component parts of caoutchouc, and the tendency to deterioration is mainly caused by the detrimental action on the rubber of soluble salts and other foreign matter dissolved by the chemicals employed in the treatment and which the final washing of the product fails to remove because of insufficient thoroughness in the washing operation, absolute thoroughness therein being so difficult as to be impracticable of accomplishment, owing to the spongy quality of the final product.

The general object of my invention is to produce reclaimed rubber of superior quality due to its freedom from the undesirable characteristics referred to, and this I successfully accomplish by employing for treatment of the waste material weak chemical solutions under ordinary boiling temperatures, by rendering the total period of time for subjecting the rubber to contact with chemicals about two hours, by resupplying to the rubber any gums lost from it by solution, by incorporating in the recovered rubber a preservative ingredient, and by rendering insoluble and precipitating out of the rubber all, or practically all, foreign matter in soluble form adhering thereto.

The procedure, as hitherto practiced, of recovering rubber from vulcanized-rubber waste and involving the boiling of the material either in an acid or an alkali solution requires the continuance of the boiling operation for a period of from ten to twenty-four hours under a temperature of from 320° to 340° Fahrenheit to effect thorough removal of the fiber and the necessary degree of devulcanization of the rubber, a further requirement being that of agitating or stirring the mass during the entire time of treatment. My invention involves the use of a chemical solution which enables the same results to be accomplished under the comparatively low temperature of about 220° Fahrenheit in an open vessel within a period of about an hour and without agitation, and it produces disintegration of heavy cotton fiber within a period of about five minutes. This solution is a weak solution of mineral acid containing from five to ten per cent. of the acid with the addition of an amount of common salt (chlorid of sodium) or other simple chlorid, such as calcium chlorid, in a proportion estimated as equaling in weight about one-third that of the fiber and sulfur constituent of the stock under treatment.

If it is desired to recover rubber having such fillers as lead, zinc, and lime removed from it, I employ hydrochloric acid, and if the removal of fillers is not desired I employ sulfuric acid, the time of treatment being the same with either acid, though a solution of the strength of fifteen to twenty per cent. produces the best results when hydrochloric acid is used.

By mixing and boiling with the rubber waste in a finely-divided condition the solution of salted acid the action on the heaviest cotton fiber so disintegrates it within a period of about five minutes as to adapt it to be readily picked to bits, and within a period of about thirty minutes the rubber begins to swell and blossom, this action continuing for a period of from fifteen to forty-five minutes, depending upon the strength of the acid solution and the amount of salt used. The rubber is then removed and pressed or squeezed to drain out of it the liquid and is swollen by the treatment to fully three times its original bulk. Moreover, the treatment has reduced it to a condition of thorough devulcanization and to a light-gray color, which darkens somewhat in the subsequent step of drying the rubber. Most of the fiber remains in an undissolved state and precipitates in the solution from which it may be readily removed, as by screening. Pouring the mass over a forty-mesh screen will remove all or practically all of the disintegrated fiber, while the particles of rubber are so swollen as to be intercepted by the screen and saved. The rubber product is then thoroughly washed with clean water or first subjected to an acid-neutralizing treatment with a suitable alkali, such as soda or the like, and thereupon dried. If used in this state, as it may be, the color of the rubber when the latter is rolled into a sheet will be a medium shade of gray, if hydrochloric acid was used in the treatment, and a somewhat darker color if the chemical used was sulfuric acid. The rubber product of the described treatment, however, is deficient in the degree of gumminess and tackiness desirable for it to possess for utilization. To impart to it these qualities, I apply my discovery that rubber will take up a resin from such solutions as resinate of soda or resinous borate of soda by boiling the product of the first-described treatment for a period of about thirty minutes (though the boiling period may be prolonged without detriment to the product) in a weak solution of either or both of these solvents, the duplex solution being, however, preferred, owing to the well-known preservative effect on vegetable matter of boracic acid and alkaline borates. I find that superior results are produced where for each pound of the rubber a two-per-cent. soda solution is used, to which one-fourth of an ounce of soluble gum, such as common pine-tree rosin or shellac, and one-fourth of an ounce of borax or one-eighth of an ounce of boracic acid have been added; but it is not essential to use both gum solvents, as either one used alone affords a very good product. As the next step in the treatment the rubber is subjected to thorough washing; but it is found to be practically impossible to remove from it all the soluble matter as perfectly as is desirable to insure to it the quality of durability. I therefore drain off the gum solution and boil the rubber for a period of about fifteen minutes in water to which a suitable precipitant (preferably an aluminium salt, such as alum) is added in sufficient quantity (say about one-half of an ounce to each gallon of water) to render insoluble and precipitate the soluble matter, with the result of thoroughly clarifying the solution. This treatment has the further peculiar action of causing considerable of the sand and other impurities, which have resisted all the other treatments referred to which are known to me, to drop out of the sponge-like rubber product.

The rubber thus recovered is washed and dried and when reduced to sheet form possesses every characteristic of the virgin article compounded—namely, that of presenting a glossy edge, when cut, toughness, and elasticity in a degree fully fifty per cent. greater than any rubber I have been able to reclaim by any of the treatments in use at the present time, and my product is free from fiber and has excellent working and keeping qualities.

I have ascertained that calcium chlorid acts almost as energetically as sodium chlorid in applying it to my purpose as a substitute for the common salt, also that potassium chlorid is effective and that the simple salts of the other halogen elements, such as the iodid or bromid of potassium or sodium may also be used, my purpose in mentioning these substances being to suggest that my investigations have included them, and I find their action to be peculiar. Thus, for example, by adding potassium iodid to a ten-per-cent. solution of sulfuric acid containing cotton fiber the liquid remains yellow while boiling during the period of about fifteen minutes, in which the fiber is undergoing decomposition without disintegration; but the instant that disintegration of the fiber takes place a strong reducing action shows itself and the iodine is set free from the solution, which becomes of a deep violet color.

My improvement pertaining to the use of a suitable salt by adding it to the weak acid solution is not to be confounded with a patented process known to me for recovering rubber from rubber waste, in which hypochlorid of lime in an acid solution or a mineral acid with salt and an oxidizing agent, such as peroxid of manganese, are employed, for these would not subserve my purpose, since the chlorin of these salts and mixtures are converted into gaseous chlorin and escape as such, while the gist of my decomposing solution is the presence of a simple chlorid salt of an alkaline element which does not set free its chlorin in the presence of a mineral acid. In the practice of my improvement addition of a hypochlorid would be a mere waste and interpose a nuisance in working, though such addition would be within my invention if made to an acid solution containing a simple chlorid salt in such quantity that its chlorin is not practically all set free in the gaseous state.

What I claim as new, and desire to secure by Letters Patent, is—

1. The process of recovering rubber from rubber waste, which consists in boiling the finely-divided material in a mineral-acid solution with the addition of a halogen salt of the alkaline group, such as sodium or calcium chlorid, without setting free in a gaseous state the chlorin, bromin, or iodin, and removing the dissolved and decomposed fiber.

2. The process of recovering rubber from rubber waste, which consists in boiling the finely-divided material in a mineral-acid solution with the addition of a halogen salt of the alkaline group, such as sodium or calcium chlorid without setting free in a gaseous state the chlorin, bromin or iodin, and removing the dissolved and decomposed fiber and mineral substances.

3. The process of recovering rubber from rubber waste, which consists in boiling the finely-divided material in a mineral-acid solution with the addition of a halogen salt of the alkaline group, without setting free in a gaseous state the chlorin, bromin or iodin, removing the acid and dissolved matter from the rubber, then boiling the rubber in a solution of alkaline salt, and washing and drying the product.

4. The process of recovering rubber from rubber waste, which consists in first decomposing and then removing the fiber, and treating the resultant rubber product with a solution of an alkaline salt, such as soda or potash, with the addition of a chemical substance having a preservative effect on vegetable matter, such as boracic acid or sodium borate, and washing and drying the product.

5. The process of recovering rubber from rubber waste, which consists in first decomposing and then removing the fiber, and treating the resultant rubber product with a solution of an alkaline salt, such as soda or potash, with the addition of a soluble gum, and washing and drying the product.

6. The process of recovering rubber from rubber waste, which consists in first decomposing and then removing the fiber, and treating the resultant rubber product with a solution of an alkaline salt, such as soda or potash, with the addition of a chemical substance having a preservative effect on vegetable matter, such as boracic acid or sodium borate, and of a soluble gum, such as rosin or shellac, and washing and drying the product.

7. As a step in the recovery of rubber from rubber waste by decomposing and separating the fiber from the rubber by subjecting the material to the action of a suitable chemical solution, that of removing from the rubber product soluble compounds remaining from the solution employed in previous treatment, which consists in rendering said soluble compounds insoluble and removing them from the rubber product by precipitation.

8. As a step in the recovery of rubber from rubber waste by decomposing and separating the fiber from the rubber by subjecting the material to the action of a suitable chemical solution, that of removing from the rubber product soluble compounds remaining from the solution employed in previous treatment, which consists in rendering insoluble and precipitating said compounds by treating said product with a weak astringent solution of aluminium salt.

9. The process of recovering rubber from rubber waste which consists in boiling the material in a finely-divided state in a mineral-acid solution with the addition of a halogen salt, removing the dissolved fiber, boiling the rubber product in a solution of an alkaline salt, with the addition of a chemical substance having a preservative effect on vegetable matter and with a soluble gum, then treating the product with a weak astringent solution of an aluminium salt having the effect of rendering insoluble any remaining soluble compounds in the rubber and precipitating the same, and finally washing and drying the product.

WILLIAM A. KÖNEMAN.

In presence of—
 L. HEISLAR,
 J. H. LAUDES.